United States Patent

Dickman

[11] 3,993,913
[45] Nov. 23, 1976

[54] TIDEWATER POWER SYSTEM

[76] Inventor: Smith V. Dickman, 1807 27th St., West, Bradenton, Fla. 33505

[22] Filed: Mar. 28, 1975

[21] Appl. No.: 562,840

[52] U.S. Cl. ............................................. 290/53
[51] Int. Cl.[2] ...................................... F03B 13/10
[58] Field of Search ................. 290/42, 43, 53, 54

[56] References Cited
UNITED STATES PATENTS

| | | | |
|---|---|---|---|
| 827,744 | 8/1906 | Melton | 290/53 X |
| 2,820,148 | 1/1958 | Southwick | 290/53 X |
| 3,426,540 | 2/1969 | Fixel | 290/42 X |
| 3,912,937 | 10/1975 | Lesser | 290/43 |

Primary Examiner—Robert K. Schaefer
Assistant Examiner—W. E. Duncanson, Jr.
Attorney, Agent, or Firm—Milton M. Field

[57] ABSTRACT

A system for extracting power from the tides includes a dam constructed in a body of water subject to tidal flow for separating the body of water from a tidal basin between the dam and the shoreline. A plurality of water wheel assemblies are mounted on the dam and include mounting saddles for mounting water wheels for rotation about a horizontal axis at a level about the high tide level of the body of water and with the bottom of the water wheel a substantially the low tide level of the body of water. Each saddle includes a pair of vertical wall members, between which the water wheel is mounted for rotation, and a horizontal wall portion below the water wheel provided with a concave recess receiving the water wheel. The saddle is so constructed that substantially all of the water flowing from the body of water to the tidal reservoir and vice versa will flow through the water wheels. In order to control this flow, a brake is provided to block rotation of the water wheels at the discretion of an operator. The dam is constructed from a plurality of spaced vertical I-beams and a plurality of horizontal slabs which extend between successive I-beams. A saddle extension mounts the saddle on the dam by fitting vertical arm members between the flanges of successive I-beams. The water wheel includes a plurality of radially extending paddles and may have its ends closed by end walls; vent apertures are provided, either in the paddles adjacent the shaft or in the end walls adjacent the shaft. In one embodiment, a gate is provided and is moved in response to the speed of rotation of the water wheel to maintain the speed of rotation substantially constant.

23 Claims, 20 Drawing Figures

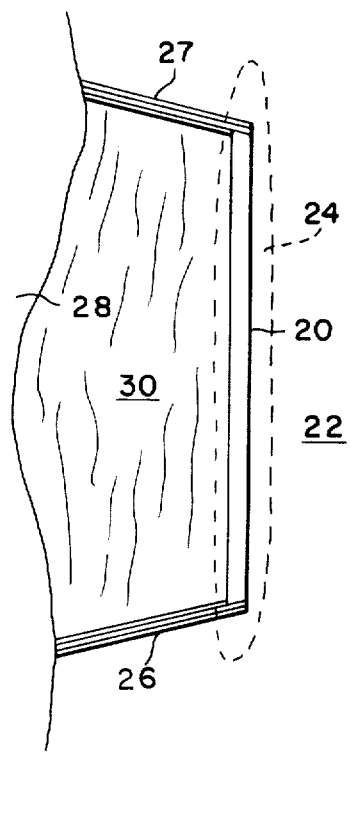
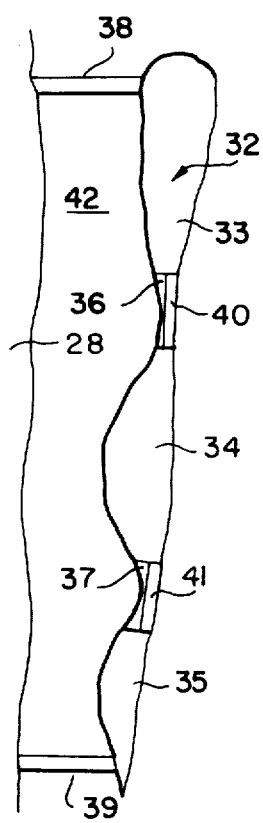
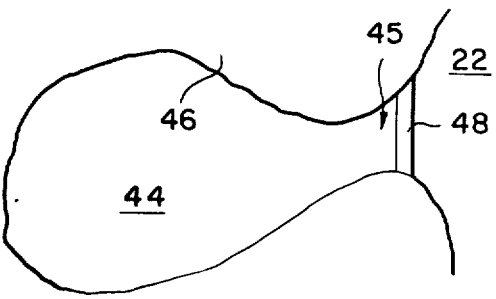
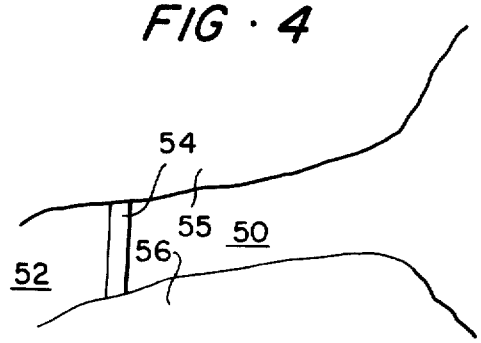
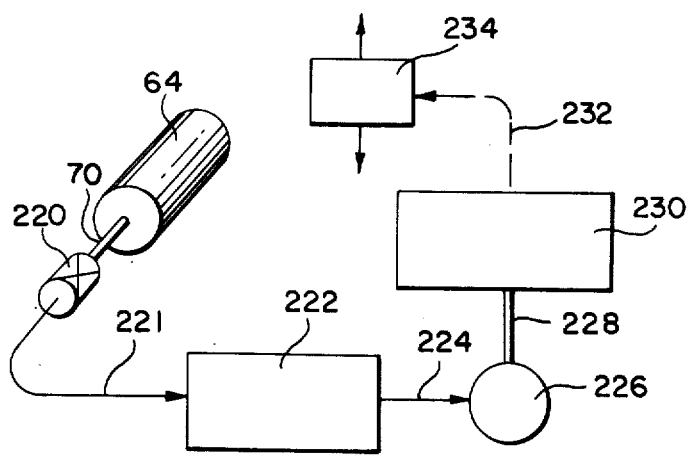

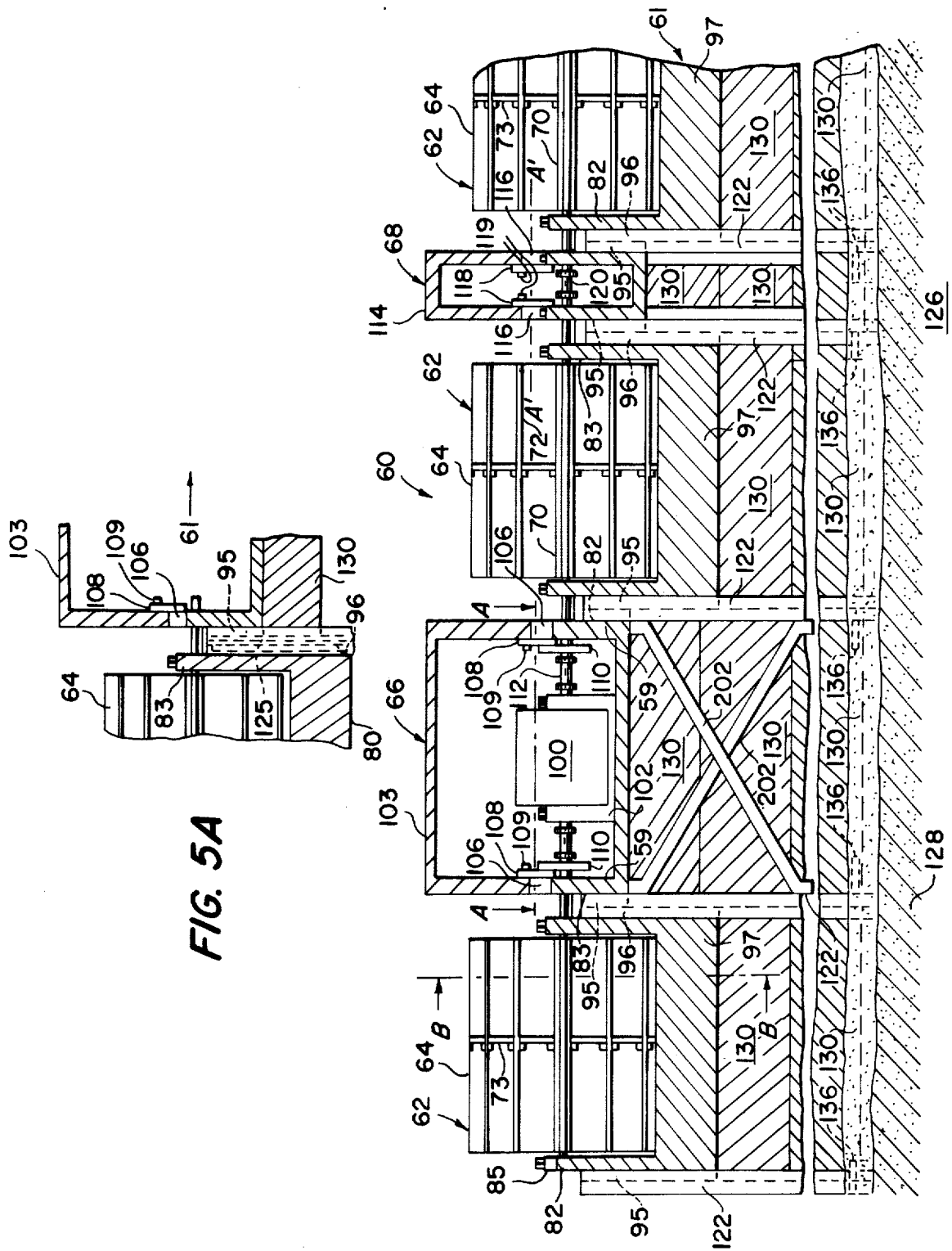

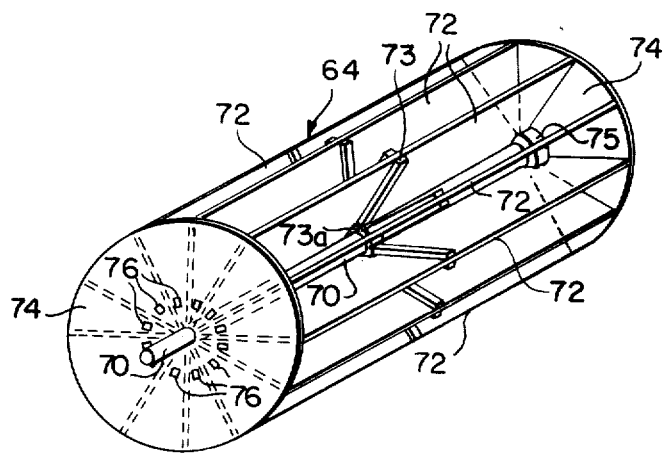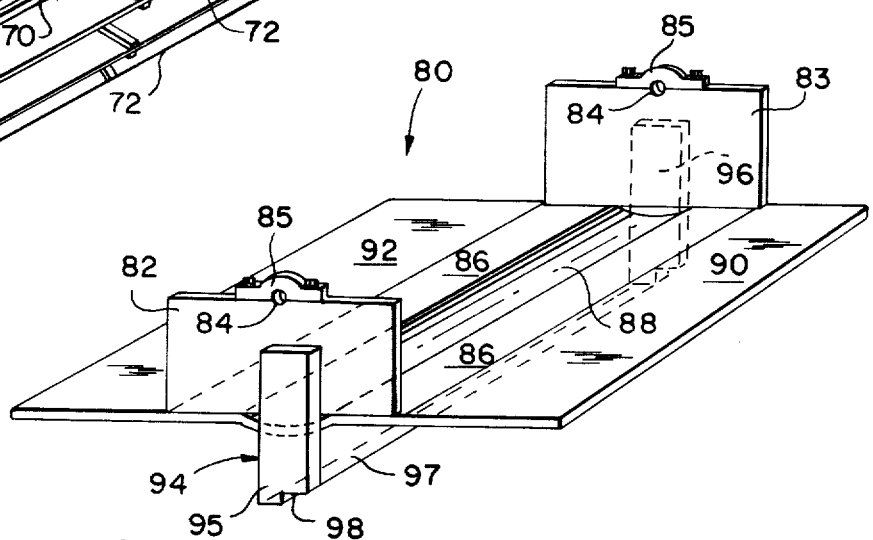

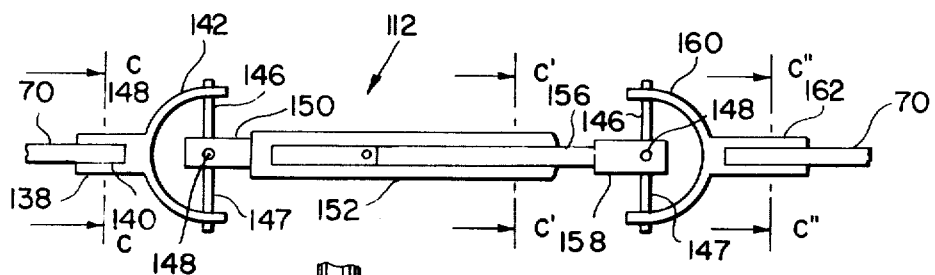
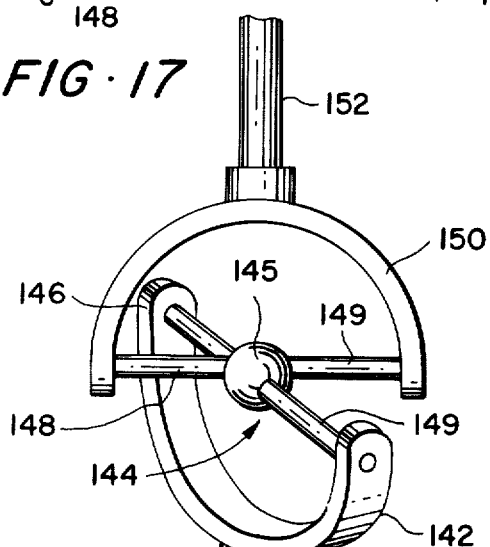
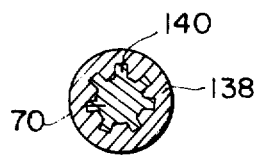
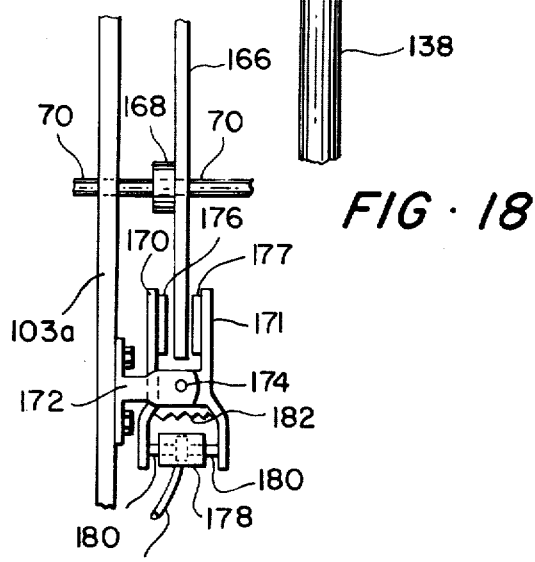
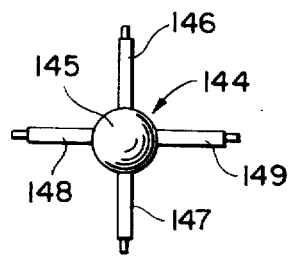

TIDEWATER POWER SYSTEM

BACKGROUND OF THE INVENTION

This invention relates to power systems, and more particularly, to systems for extracting power from the tides.

The recently developed shortage of fossil sources of energy, such as petroleum, and the sharp increase in the price of these energy sources has stimulated a great deal of interest in alternative sources of power. Among the more attractive of these alternatives is the generation of electrical power from the tides. This source is inexhaustible, non-polluting, and has no fuel requirements. In view of these advantages, it is not surprising that there has long been an interest in the generation of electrical power from the tides.

Among prior art tide power systems are the systems disclosed in Newhouse U.S. Pat. No. 189,643, patented Apr. 17, 1877; Wilde U.S. Pat. No. 537,398, patented Apr. 9, 1895; Knobloch U.S. Pat. No. 582,651, patented May 18, 1897; Keller U.S. Pat. No. 584,367, patented June 15, 1897; Wilkinson U.S. Pat. No. 651,454, patented June 12, 1900; Nevins U.S. Pat. No. 726,733, patented Apr. 28, 1903; Smith U.S. Pat. No. 946,585, patented Jan. 18, 1910; Rennolds U.S. Pat. No. 1,333,443, patented Mar. 9, 1920; Defour U.S. Pat. No. 1,659,481, patented Feb. 14, 1928; Roure U.S. Pat. No. 2,700,874, patented Feb. 1, 1955; and Fixel U.S. Pat. No. 3,426,540, patented Feb. 11, 1969. These patents disclose various schemes for directing the flow of water in response to the tides through a water wheel coupled to an electric generator or other power consuming instrumentality. In general, these systems are characterized by an inefficient use of the power available from the tides or by complex structures which are both expensive to construct and difficult to maintain. In particular, these systems have not included simple means for controlling the flow of tidewater.

SUMMARY OF THE INVENTION

It is accordingly the principal object of the present invention to provide a tidewater power system which overcomes the aforementioned drawbacks of prior art systems.

More specifically, it is an object of the present invention to provide a tidewater power system which is easy to control in order to extract the maximum power possible from the tides and which is relatively simple to construct and easy to service and maintain.

Briefly, the present invention contemplates the provision of a dam reaching from the bottom of the sea or between land masses across other bodies of water subject to the tides. A plurality of water wheel assemblies are mounted on the dam. Each water wheel assembly includes a water wheel, a mounting saddle for mounting the water wheel for rotation about a horizontal axis located above the level of high tide of the body of water, such as the sea or other body of water subject to tides, and with the bottom of the water wheel located at the low tide level. The dam and aprons leading to the water wheel control the flow to the water wheels which are so mounted that the only flow of water over the dam will be through the water wheels. In order to control this flow so that only tide flows at maximally productive times will be utilized, the water wheels are provided with brakes under the control of an operator for precluding rotation of the water wheels unless rotation is desired by the operator.

In particular, the saddles include a pair of vertical walls between which a water wheel is mounted and a horizontal wall having a concave recess into which the bottom of the water wheel is received. There is little clearance between the water wheel and the vertical walls and the concave recess to that little or no water can leak past the water wheel, when the water wheel is braked against rotation. In order to prevent air locks, and the like, vent apertures are provided in the paddles of the water wheel closely adjacent to the water wheel shaft or, alternatively, in the end walls of the water wheel also closely adjacent to the water wheel shaft.

The dam is constructed with a plurality of vertical I-beams which are spaced apart a distance equal to the distance between the ends of one of the mounting saddles. This space, from the sea bottom upwardly, is filled with a plurality of horizontal slabs which are lapped at adjacent edges, and which extend between the webs of adjacent vertical I-beams. A saddle extension includes vertical arms, each of which are received between the flanges of a vertical I-beam adjacent its upper end. In this way, the saddle, and with it the water wheel, may be easily removed by vertical movement upwardly by a crane, or the like. A plurality of generator housings are also mounted on the dam and are also connected between vertical I-beams in this manner to facilitate removal for servicing. Coupling between water wheels and electric generators within the electrical generator housings is effected by the use of double universal joints. In one embodiment of the invention, the speed of rotation of the water wheels is kept fairly constant by coupling a tachometer generator to the water wheels and using the signal from the tachometer generator to control the location of a gate which regulates the flow of water to the water wheel to maintain the speed of rotation substantially constant.

These and other objects, features and advantages of the present invention will become more readily apparent upon consideration of the accompanying drawings and the detailed description of the invention.

BRIEF DESCRIPTION OF THE DRAWINGS

FIG. 1 is a schematic diagram showing one way of implementing the present invention by constructing a dam in the open sea;

FIG. 2 is a schematic diagram showing another way of implementing the present invention in a region between an island, or group of islands, and the coast;

FIG. 3 is a schematic diagram showing an implementation of the present invention across the mouth of a gulf or bay;

FIG. 4 is a schematic diagram showing an implementation of the present invention across a river affected by tides;

FIG. 5 is a partial front section view of a tidewater power system of the present invention;

FIG. 5A is an enlarged fragmentary section view of the tidewater power system as shown in FIG. 5 showing a detail thereof;

FIG. 6 is a partial vertical section view showing a water wheel and mounting structure of the present invention as seen from section line B—B;

FIG. 7 is a perspective view of one embodiment of water wheel of the present invention;

FIG. 9 is a perspective view showing a mounting saddle for a water wheel of the present invention;

FIG. 12 is a partial elevation view showing the coupling used in the system of the present invention;

FIG. 13 is an elevation view of an element of the coupling;

FIG. 14 is a section view taken along the lines C—C of FIG. 12;

FIG. 17 is a partial perspective view showing part of the coupling;

FIG. 18 is a partial plan view showing the brake means of the present invention; and FIG. 19 is a schematic diagram showing an alternative embodiment of the present invention.

DETAILED DESCRIPTION OF THE PREFERRED EMBODIMENTS

Figure 8:
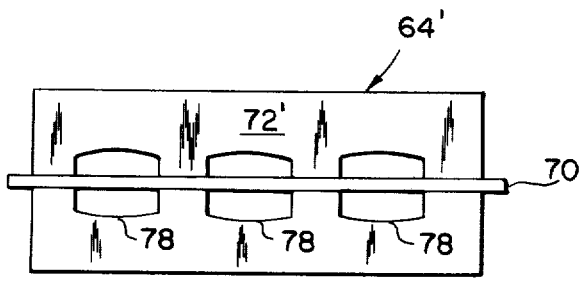
FIG. 8 is an elevation view showing a pair of paddles of a water wheel according to another embodiment of the present invention.

According to the present invention, one or more dams are constructed in a body of water subjected to tidal action to separate the body of water from a tidal basin into which, or from which, tidewater will flow through a plurality of water wheels mounted on the dam. The water wheels, in turn, will drive one or more electric generators to generate useful power.

Referring to FIG. 1, a dam 20 is constructed in the ocean 22 preferably on a shoal, or sandbar, 24 which provides a relatively shallow portion of the sea and which may be several miles from shore 28. The ends of the dam 20 are connected by a pair of additional sea walls 26 and 27 to the shore 28, thus creating a tidal basin 30 between dam 20 and the sea walls 26 and 27 and the shoreline. As will be explained more fully hereinafter, a plurality of water wheel assemblies are positioned on dam 20 to rotate about a horizontal axis which is above the highest high tide level to be experienced in body of water 22 with the bottom of the water wheels located at the low tide level of the body of water. It will be observed that the sea walls 26 and 27 extend well above the high tide level so that substantially all of the tidal flow to and from the body of water 22 and the tidal basin 30 will flow over the dam 20 through the water wheel assemblies, thus generating useful power. The tidal reservoir, or basin, 30 which extends along several miles of shoreline 28 is large enough to hold the flow of the flood tide for an average duration of several hours.

The dam is designed to control the tidal flow to and from tidal basin 30, forcing it over the dam through the water wheels into the basin 30 to fill the basin when the flood tide is flowing. After the flood tide has stopped, and the ebb tide has begun, brakes will be employed, as will be presently described, to hold the water in basin 30. Thereafter, the ebbing tide on the ocean side of dam 20 will move away from the dam. After the tide has lowered substantially, the brakes are released, and water from the filled basin 30 starts flowing out of the basin through the water wheel assemblies to cause them to turn in a reverse direction, emptying the basin and readying it for the return of the flood tide flow. This back and forth flow will continue for each flood and ebb tide in succession. On a typical day, there will be two such cycles.

The principles of the invention may also be applied to a situation in which a long narrow island, or series of islands, is located parallel to the mainland. Thus, in FIG. 2, such a island 32 is provided parallel to the mainland 28. A bay 42 is located between island 32 and the mainland, and this bay 42 will be used as the tidal reservoir or basin. The ends of bay 42 are closed off by a pair of dams 38 and 39 which extend from the island 32 to the mainland, and each of these dams will be of the same height, relative to low and high tide level, as the dam 20 of FIG. 1. Again, a plurality of water wheel assemblies will be placed on dams 38 and 39. In the event that the capacity of these water wheel assemblies is not sufficiently great, additional dams may be constructed on island 32. Thus, a narrow portion 36 of the island is excavated, and a dam 40 is built between the smaller islands 33 and 34 created by the excavation. In the same manner, a narrow portion of the island at 37 is excavated to form a third island 35; the gap is closed by another dam 41 extending between islands 34 and 35. Dams 40 and 41 also support water wheel assemblies. It will be observed, that the same concept is applicable to a situation in which the three islands 33, 34, and 35 are naturally separate. In this case, the dams 40 and 41 will be built across the natural inlets between islands 33 and 34, on the one hand, and islands 34 and 35 on the other hand.

Referring to FIG. 3, it will be seen that the concepts of the invention may also be applied to a gulf or bay 44 surrounded on three sides by the shoreline 46 and connected to a body of water 22 subject to tidal action by a narrow mouth, or inlet, 45. Here, a dam 48 is built across the narrow mouth 45, converting gulf 44 into a tidal basin. This dam, which also is constructed in accordance with the principles described with respect to the dam 20 of FIG. 1, directs the tidal flow to and from tidal basin 44 and the body of water 22 through waterwheel assemblies positioned on the dam.

FIG. 4 illustrates the application of the principles of the invention to a river subject to tidal flow. Here, the river 50 is blocked by a dam 54, which extends from one shoreline 55 to the other shoreline 56 of the river. Behind the dam there is thus created a reservoir, or tidal basin, 52 separated from the mouth of the river by the dam. Again, the dam 54 is constructed in accordance with the principles of the invention as previously described. Any river subject to tidal flow is suitable, particularly a river in which the tide flows several miles upstream. If the river is a navigable river, gates may be provided through the dam 54 to let boats through at low tide or high tide, at a time when the water lever is equal on both sides of the dam.

Each of the above versions of the invention, arrange a dam, or dams, to create a tidal basin or reservoir so that the flow to and from the tidal reservoir or basin may be converted into useful power. In each case, water wheels are mounted on the dam; and substantially all of the flow of water over the submerged dam is directed through the water wheels. The capacity of the basin for power generation is that part of the basin which lies above the low tide level and should correspond to the flow of the flood tide for optimal results.

When a bay is considered for utilization in accordance with the invention, the dam, or dams, if possible, should be placed so that the size of the basin will correspond with the capacity of the water wheel assemblies to be mounted on the dam or dams. In all cases, the ebb flow will provide approximately the same amount of power as the flood tide.

Turning to FIG. 5, it will be seen that a tidewater power system 60 according to the invention includes a dam 61, corresponding to one of the dams of FIGS. 1 through 4. A plurality of water wheel assemblies 62 are mounted on the dam, and each of these assemblies includes a water wheel 64 which will be driven by the tidal flow to and from the tidal reservoir or basin. One or more generator assemblies 66 are also mounted on the dam. The coupling between adjacent water wheels 64 is accomplished thrugh a coupling assembly 68, which is also mounted on the dam.

As will be more clearly seen from FIG. 7, each of the water wheels 64 includes a wheel shaft 70 and a plurality of flat paddles 72 extending radially therefrom. The ends of the water wheel are closed by end walls 74, which are concentric with wheel shaft 70. A hub 75 extends inwardly from each end wall 74 about shaft 70. V-shaped reinforcements 73 are placed between paddles all the way around the wheel to keep paddles 72 from springing. The inner ends of reinforcements 73 are secured to a hub 73a on shaft 70. It is to be noted that a plurality of apertures 76 are provided in the end walls 74 adjacent to shaft 70. These apertures 76 serve as vent holes for air trapped in the space between the paddles, thus preventing an air lock from inhibiting even flow of water through the water wheel. In an alternative embodiment of the water wheel, as illustrated by water wheel 64' in FIG. 8, vent holes 78 are provided through the paddles 72' adjacent to the wheel shaft 70. If the paddles are mounted on a spokelike support, end walls 74 may be omitted. In either case, vents 78 are necessary to let air in as the paddles move from the water and prevent a vacuum from retaining water in the space between paddles, thus causing an even outflow.

As will be observed from FIGS. 5, 6 and 9, each of the water wheels 64 is mounted for rotation within a saddle assembly 80, which includes a pair of vertical walls 82 and 83 upstanding from a horizontal wall 86. As seen most clearly from FIG. 9, a semicircular recess is provided at the upper edge of each of the vertical walls 82 and 83. This recess is opposed by a semicircular recess provided in a bridge member 85, thus forming bearings 84 for water wheel shaft 70 on walls 82 and 83. These bearings, and wheel shaft 70, are positioned in a plane which is above the highest high tide level of the body of water subject to tidal flow. A concave recess 88 is provided in horizontal wall 86 directly below shaft 70. The bottom of recess 88 is positioned at the level of the low tide in the body of water. As is seen in FIG. 6, the bottom of water wheel 64 is received in recess 88. A pair of aprons 90 and 92 extend in the plane of horizontal wall 86 to the front and rear thereof, respectively. For the purpose of mounting saddle assembly 80, in a manner to be explained more fully hereinafter, a saddle extension 94 is provided. This extension comprises a pair of depending vertical arms 95 and 96 which are mounted on vertical walls 82 and 83, respectively. Vertical arms 95 and 96 extend below concave recess 88 and are secured to opposite ends of a mounting block 97 positioned beneath concave recess 88. It is to be noted that a shoulder 98 is provided at the lower end of vertical arms 95 and 96 and block 97. The purpose of this shoulder will become more readily apparent from what follows.

It will be observed, most particularly from FIGS. 5 and 6, that water wheel 64 is so mounted on saddle assembly 80 that there is little clearance between end walls 74 of water wheel 64 and vertical wall members 82 and 83. In addition, waer wheel 64 is received within concave recess 88 with little clearance. There is thus very little opportunity for water to leak past water wheel 64 when it flows through water wheel assembly 62 from apron 90 or apron 92, and substantially all of the water will flow through the water wheel.

Since bearings 84 support water wheel shaft 70 at a level which is above the highest high tide level of the body of water, and since the lower edge of water wheel 64, when it is mounted between bearings 84, is set at a level which is substantially the low tide level of the body of water, there is an opportunity for a tidal flow through water wheel assembly 62 when the water level on either side of the water wheel assembly is above low tide level. This is illustrated in FIG. 6. Here, water 99 is shown flowing above aprons 90 and 92 and through water wheel 64. Unless, in a manner to be described hereinafter, water wheel 64 is braked, water wheel 64 will be driven by the flow of water 99 to provide useful power on water wheel shaft 70. When, however, water wheel 64 is braked, the water wheel serves as an extension of dam 61, blocking the flow of water.

Figure 10:
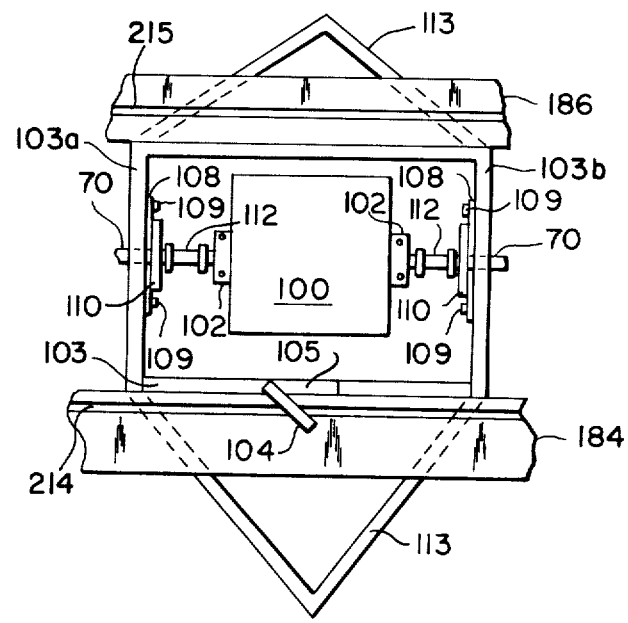
FIG. 10 is a plan view of a generator housing of the system of the present invention as seen from section line A—A.
Figure 15:
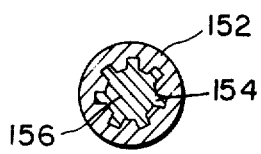
FIG. 15 is a section view taken along the lines C'—C' of FIG. 12.

The rotation of water shaft 70 is coupled to drive an electrical generator 100 within generator assembly 66. As will be seen from FIGS. 5 and 10, generator 100 is positioned on a generator base 102 within a generator room formed by a generator housing 103 having end walls 103a and 103b. Referring to FIG. 10, it will be noted that a door 104 may be opened to provide access to the generator room through a doorway 105. In this way, the generator may be serviced. The ends of generator housing 103 are provided with openings 106 to accommodate shaft 70. In order to keep water from splashing into generator housing 103, a closure plate 108 is provided for each of the openings 106 and depends downwardly within the housing to a point below the top of shaft 70 and around shaft 70 to serve as a seal. It will be noted that bolts 109 secure the closure plates 108 to the walls of generator housing 103. It will be observed that water wheel shaft 70 extends into generator housing 103 and is coupled to a brake assembly 110. As previously mentioned, brake assembly 110 is utilized for braking the water wheel when it is desired to stop the flow of water 99 through the water wheel assembly. The brake assembly 110 is coupled by means of a double universal joint coupling 112 to electric generator 100. It will be noted that similar couplings are provided at both ends of electric generator 100 so that the generator is coupled to both of the adjacent water wheels 64.

The tidewater power system of the present invention may include one or more power generating units. Each of these units includes a single generator 100 driven by several water wheels 64. Within each unit it is thus necessary to provide a coupling between adjacent water wheels 64. For this purpose, coupling assembly 68 is provided. It will be noted that this assembly includes a coupling housing 114 which is constructed in the same manner as generator housing 103 except that it need not have a length of the same magnitude. The end walls of coupling housing 114 are also provided with openings 116. Again, water wheel shaft 70 extends into coupling housing 114 through holes in its end walls and is coupled by means of a double universal joint coupling 120 to the next water wheel 64. It is to be noted, that here also closures 118 are provided for preventing water from splashing into coupling housing 114. The closures 118 are secured by a plurality of bolts 119 to the closure housing 114.

Figure 11:
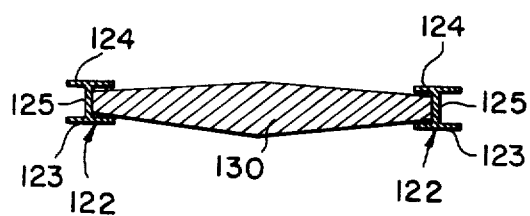
FIG. 11 is a top section view of a portion of the dam of the tidal power system of the present invention.

Turning now to FIG. 5, 6 and 11, it will be observed that dam 61 is constructed from a plurality of vertically disposed I-beams or columns 122. Adjacent I-beams are spaced apart a distance substantially equal to the length of a saddle assembly 80, the length of a generator housing 103, or the length of a coupling housing 114, for reasons which will become apparent hereinafter. It will be noted that each of the I-beams 122 includes a pair of end flanges 123 and 124 connected by a web 125. The vertical I-beams 122 are set in the solid footing 126 beneath ocean floor 128 as, for example, by using pile-driving techniques or other known techniques for installng vertical pier members. The space between successive I-beams 122 is filled with a plurality of slabs 130, which may be formed of reinforced concrete. Slabs 130, which are placed one above the other, extend from the web 125 of one I-beam 122 to the web 125 of the next I-beam 122, as is most clearly seen in FIG. 11. It is important that the bottom slab 130 be firmly seated in sea bottom 128 to prevent water from flowing under the dam. However, stops 136 are provided on I-beams 122 to keep the slabs from settling further. Referring to FIG. 6, itwill be seen that slabs 130 have lapped shoulders 132 and 133 which are complimentary and which are lapped to prevent leakage through the dam.

Turning to FIG. 9, it will be remembered that a saddle assembly mounting structure is formed by vertical arms 95 and 96 and a mounting block 97 extending therebetween. When it is desired to mount a saddle assembly 80 on top of the dam, vertical arms 95 and 96 are received between the end flanges 123 and 124 of successive vertical I-beams with the mounting block 97 extending therebetween on top of the uppermost slab 130. It will be noted that vertical arms 95 and 96 and block 97 are provided with a shoulder 98 which cooperates with the shoulder 132 of the uppermost slab 130, as is clearly seen in FIG. 6. By virtue of this arrangement, it is possible to lift an entire water wheel assembly 62 upwardly fromthe dam by means of a crane or the like. This facilitates ready replacement of a damaged water wheel assembly when this becomes necessary. Generator assembly 66 and coupling assembly 68 are similarly provided with downwardly extending vertical arms which may become engaged between the end flanges of successive vertical I-beams so that these assemblies, also, may be readily removed by lifting them vertically when repair or replacement is necessary. The top portion of generator housing 103 is separable from the bottom portion thereof along section line A—A as seen in FIG. 5. With the top removed, as seen in FIG. 10, the water wheel may be readily removed and the bearing may be repaired. Likewise, the top portion of coupling housing 114 is removable for similar purpose.

As is seen in FIG. 10, each generator assembly 66, supports a V-shaped shield or water deflector 113 on both the seaward and tidal basin sides of the assembly. These shields serve to divert the tidal flow to the water wheel asemblies with the least possible turbulence to increase the flow of water therethrough. The diverted flow will also raise the level of water at the water wheels. Shields 113 may be formed as part of generator housing 103. Coupling assemblies 68 are supplied with similar V-shaped shields for the same purpose.

Figure 16:
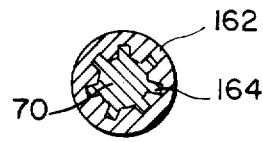
FIG. 16 is a section view taken along the lines C'λ'—C'' of FIG. 12.

The structure and operation of the double universal joints employed as coupling elements will be more readily understood from consideration of FIGS. 12–17, inclusive. Water wheel shaft 70 is received within a tubular shaft 138. A spline 140, as is seen in FIG. 14, on shaft 70 cooperates with grooves in shaft 138. In this way, relatlive axial movement between shaft 70 and shaft 138 is made possible to facilitate assembly, while rotation of one results in rotation of the other. A yoke 142 is provided at the other end of shaft 138 and cooperates with a joint coupling member 144. As will be observed from FIG. 13, joint coupling member 144 includes a central hub portion 145 from which four arms 146, 147, 148, and 149 extend. It will be noted that arms 146 and 147 are diametrically opposed and perpendicular to the diametrically opposed arms 148 and 149. The ends of yoke 142 are engaged with the ends of arms 146 and 147, respectively. The other arms 148 and 149 of joint coupling memer 144 are engaged with a yoke 150 extending from one end of a shaft 152. Shaft 152 is tubular at its opposite end to receive a shaft 156 therewithin. Again, as seen from the section view of FIG. 15, shaft 156 has a spline 154 cooperating with grooves on shaft 152. The other end of shaft 156 includes a yoke 158 which cooperates with another joint coupling member 144. Here, yoke 158 engages the ends of arms 148 and 149. The other arms 146 and 147 of joint coupling member 144 are engaged with the ends of a yoke 160 at one end of a shaft 162. A water wheel shaft 70 is received within the tubular end of shaft 162, and, as shown in FIG. 16, is provided with a spline 164 cooperating with grooves on shaft 162 to form a third spline connection. It will be recognized, that double universal joint coupling 112 provides a great deal of flexibility and accommodates to adjustments of the water wheels and to other movement to different parts of the system.

The brake assembly 110 is shown in greater detail in FIG. 18. Water wheel shaft 70 extends below bridge member 85 through the bearing provided at the top of wall 82. A brake disk 166 is mounted on shaft 70 by means of a spline coupling 168. One edge of brake disk 166 is positioned between a pair of brake pads 176 and 177 mounted, respectively, on a pair of brake arms 170 and 171. These are mounted on a bracket 172 which is bolted to end wall 103a, and a pivot pin 174 serves as a hinge for brake arms 170 and 171. Each of these arms has a brake arm extension, and a hydraulic cylinder 178 is positioned between the brake arm extensions. It will be noted that a hydraulic line 179 provides hydraulic fluid under pressure to cylinder 178. A pair of opposed pistons within cylinder 178 are connected to piston rods 180 which are engaged with the brake arm extensions. Thus, when hydraulic fluid is fed to hydraulic cylinder 178, the brake arm extensions will be forced apart, and as a result, the brake arms 170 and 171, on the opposite side of hinge 174, will be forced together to bring brake pads 176 and 177 into engagement with opposite sides of brake disk 166. A spring 182 is also positioned between the brake arm extensions. When the operator wishes to brake the water wheels, he acutates a control (not shown), such as a brake pedal or lever, to provide a supply of hydraulic fluid through hydraulic line 179. This results in expansion of the hydraulic cylinder and actuation of the brake. When it is desired to remove the braking action of the brake assembly, the operator actuates a control to remove hydraulic fluid though hydraulic line 179, and spring 182 pulls the extensions of brake arms 170 and 171 together, to move the pad supporting ends of brake arms 170 and 171 apart, thus releasing brake pads 176 and 177 from brake disk 166.

Referring to FIGS. 5, 6, and 10, it will be seen that a catwalk 184 is provided on the tidal basin side of the dam. A second catwalk 186 is provided on the seaward side of the dam. Catwalks 184 and 186 extend the entire length of dam 61 to provide workmen access to the assemblies mounted ona the dam. In bad weather, the water will be calmer on the basin side. For this reason, use of catwalk 184 is preferable; and access to the assemblies is provided on this side, as through door 104. Catwalk 184 is supported between a shoulder 190 provided on a post 188 which is spaced some distance from dam 61. The upper portion 192 of post 188 serves as part of a railing running lengthwise of the catwalk. The other side of catwalk 184 is supported on supporting posts 194 which are mounted on apron 92. The upper portions 196 serve as part of an inner railing for the catwalk. These railings guard against the possibility that the wind or waves will throw a workman into a water wheel or off the dam. In like manner, catwalk 186 is supported between a post 198 on the seaward side of the dam and a supporting post 199 mounted on apron 90. Each of the aforementioned supporting posts are generally in alignment with vertical I-beams 122 at the opposite ends of the assemblies. However, lesser supports may be placed between them. A water gate 200 is supported between the posts 198 at opposite ends of a water wheel assembly so that the water wheel assembly may be protected from excessive wave action in the body of water seaward of the dam. Suitable means, which are not shown, such as a rack and pinion or hydraulic means, permit gate 200 to be raised or lowered as desired.

Supporting posts 188 are braced by means of braces 202 which extend between supporting posts 188 and corresponding vertical I-beams 122. Braces 202 are also provided between supporting posts 198 and the other side of the corresponding vertical I-beams 122, and between adjacent supporting posts 188 and adjacent supporting posts 198.

As previously mentioned, water wheel assemblies 62, generator assemblies 66, and coupling assemblies 68 are so constructed that they may e vertically lifted for placement. This is accomplished by means of a crane which is supported on an arch-like crane carrier 204 which may be bridged across these assemblies. Crane carrier 204 includes a top wall 206 for supporting a crane and a pair of opposed side walls 208 and 209 which extend parallel to dam 61 on opposite sides of the dam. It will be noted that the lower ends of walls 208 and 209 support wheel bearing assemblies 210 on which are mounted railway-type wheels 212. A pair of tracks 214 and 215 are provided respectively on catwalks 184 and 186 and serve as a track way for the crane carrier 206. Crane carrier 204 is provided with a power drive to move it along the rails and a brake, preferably a clamp type brake which grips the rails, to stop the carrier at a desired location. In this way, crane carrier 204 may be moved longitudinally along the dam to bring the crane over any particular assembly of the tidewater power system 60. By suitably grappling the crane to an assembly, it may be vertically lifted and removed for servicing.

The operation of the above described embodiment will be readily apparent. The gate 200 may be set to control the magnitude of flow to the water wheels and, also, to protect the water wheel assemblies from excessive wave action. The water wheels 64 may be braked by brake assembly 110 until the level of the flood tide is sufficiently high that maximum power may be extracted therefrom. At this time, the operator releases the brake permitting the water wheels 64 to be rotated by the flowing water 99 which will enter the water wheel 64 from apron 90 and spill into the tidal basin from apron 92. After the basin has been filled, brake assembly 110 is again actuated to brake water wheel 64 from rotation. This again permits a head of water to be established in the tidal basin as the level of the water on the seaward side of the dam falls with the ebb tide. When the head between the level within the basin is sufficiently great, brake assembly 110 is released to again permit water wheel 64 to be driven by the water which will then be flowing from the basin onto apron 92, through water wheels 64, and from apron 90 back into the body of water on the seaward side of the dam. As previously mentioned, water wheel shaft 70 is set at a level above the highest tide level of the body of water, and the lower edge of the water wheel is set at the low tide level of the body of water. Should there be excessive wave activity, gates 200 serve to protect the water wheel assembly and maintain the level of water flowing into the water wheel assembly at a level below the level of water wheel shaft 70.

The generator 100 is of a type which will generate electricity for both directions of rotation. In this way, useful power is developed both for the flood tide flow into the tidal reservoir and for the ebb tide flow from the tidal basin. It is sometimes desirable to employ gearing between the water wheels and generator 100 to increase the speed of rotation of the generator. All of the water wheel assemblies of the system are coupled together through double universal joints, such as the double universal joints 112 and 120. These joints permit accommodation for stresses which would occur in the system if a single rigid shaft were employed.

When it is desired to service the water wheel or water wheel bearings, the crane mounted on crane support 204 may lift the housing 103 to permit servicing of the water wheel assembly. Alternatively, an entire water wheel assembly may be removed by use of the crane as was previously described. In general, the housing 103 is secured by bolts or the like when it is in use, and these bolts may be removed when it is desired to lift the housing. In like manner, the housings of the generator assembly and the coupling assembly, or the entire assemblies, may be removed for servicing in the same way.

In order to protect the water wheels from large floating objects, a screen or bars may be installed on both sides of the dam to block such objects. The screen or bars should be far enough outwardly of the dam so that they will not interfere with the flow of tidewater. These bars should havea relatively thin face with knife-like edges facing the direction of horizontal tidewater flow, but should be of substantially greater length and substantially thicker in the middle for strength. In this way, these bars will impede the flow of water as little as possible while retaining sufficient strength to withstand the impact of floating objects. If desired, thin webs may be placed between each of the bars to help hold them rigidly. It is sometimes desirable to maintain a fairly constant flow through the water wheels. This is accomplished by means of the embodiment of FIG. 19. Here, the water wheel 64 is again mounted for rotation on water wheel shaft 70. A tachometer 220 is also mounted on shaft 70 and generates an electrical signal which is a function of the rotational speed of the shaft 70. This signal is supplied on a line 221 to an electric control circuit 222 which will develop an error control signal on an output line 224. This signal is provided to a pump 226 controlling a hydraulic system. The pump supplies hydraulic fluid on a hydraulic line 228 to a hydraulic cylinder 230. The cylinder 230, by means of a mechanical coupling 232, controls the position of a gate 234. The position of the gate is thus adjusted automatically so that the flow of water to water wheel 64 will remain nearly constant. This enables the generator to operate at a substantially constant speed.

Although two forms of a water wheel have been shown, it will be readily understood that water wheels, or turbines, of different configuration may be employed. In every case, however, it is necessary that the clearance between the mounting structure for the water wheel, or turbine, and a concave recess, such as recess 88, should be kept to a minimum to insure that little, if any, water will leak past the water wheel or turbine without being put to effective use. When the water wheel or turbine is braked by the brake assembly 110, the water wheel or turbine, in effect, acts as a valve which is closed. When the brake is released, the water wheel or turbine again assumes the function of a power generating system. It will also be readily understood that brake systems of different configuration may be employed. The bearings 84, which are shown symbolically in the drawings, may take many forms and may, for example, be in the forms of ball bearings or the like. These bearings should be associated with an adjusting device so that the water wheels may be adjusted to the concavity of recess 88 to maintain the clearance at a minimum. Screws and lock nuts may be employed for this purpose. The universal joint and sliding splines which form the coupling between adjacent units of the system automatically take care of any out of alignment conditions which may arise as a result of adjustment of the water wheel.

Although a particular form of dam has been shown and described, it will be understood that the broad principles of the invention are also applicable to dams of different configurations. For example, a solid concrete wall might be employed in place of the slabs which are shown in the preferred embodiment In general, it is important that the dam be a sufficient distance from shore that a flow of several hours will result with the flow of each tide. If a dam is too close to shore, the flow would not be sufficiently great for the substantial production of power.

Although the system has been described hereinabove as a power generating system, other uses of the system are also possible. For example, in off-shore drilling for oil, there is frequently a problem caused by oil spills. A dam constructed in accordance with the present invention, could be used to prevent the oil slick from coming ashore. This is accomplished by setting the water wheel brakes and holding back the oil slick until it is cleaned up.

When the system is used for generating power, it is desirable that several water wheels be mounted for each generator to form generating units, there being many units in a large system. Typically the water wheels will be 15 or 20 feet in length with the diameter of the water wheels being selected to accommodate the depth of the tide. In most places, the bearings will be set a foot or two above high tide level.

While preferred embodiments of the invention have been shown and described, it will be apparent to those skilled in the art that changes and modifications can be made without departing from the principles and spirit of the invention, the scope of which is defined in the appended claims.

The invention claimed is:

1. A tidewater power system, comprising:
   a dam constructed in a body of water subject to tidal flow separating a tidal reservoir between a shoreline and said dam from said body of water;
   a plurality of water wheel assemblies mounted on said dam, each including a water wheel, means directing water flow to said water wheel from one of said reservoir and said body of water, and means mounting said water wheel for rotation about a horizontal axis positioned above the high tide level of said body of water with the bottom of said water wheel being positioned at substantially low tide level of said body of water, said water wheel being so mounted that said water flow is substantially restricted to flow through said water wheel; and
   brake means for selectively precluding rotation of said water wheel to control said water flow.

2. A tidewater power system as recited in claim 1, further comprising double universal joint means coupling said water wheels of adjacent water wheel assemblies.

3. A tidewater power system as recited in claim 2, further comprising electrical generating means comprising a generator housing positioned between a pair of said water wheel assemblies, an electrical generator within said housing, and double universal joint means coupling said electrical generator to said pair of water wheel assemblies.

4. A tidewater power system as recited in claim 3, further comprising V-shaped flow deflection means for directing water flow from said generator housing to said pair of water wheel assemblies.

5. A tidewater power system as recited in claim 1, wherein said means mounting the water wheel comprises saddle means including a pair of vertical walls closely adjacent opposite ends of said water wheel, a pair of bearings for said water wheel mounted on said pair of vertical walls, a horizontal wall extending between said vertical walls beneath said water, wheel said horizontal wall having a concave recess complimentary to said water wheel and snugly receiving said bottom of said water wheel.

6. A tidewater power system as recited in claim 5, wherein said means directing water flow to said water wheel comprises a pair of aprons in the plane of said horizontal wall between said concave recess and said body of water and said concave recess and said tidal reservoir, respectively.

7. A tidewater power system as recited in claim 5, wherein said dam includes vertical I-beams, each positioned in alignment with the ends of said saddle means, and said means includes a saddle extension, including a pair of vertical arms at said ends dimensioned to fit between the flanges of one of said vertical I-beams.

8. A tidewater power system as recited in claim 7, wherein said dam further includes a plurality of slabs extending between adjacent vertical I-beams, adjacent edges of said slabs being lapped.

9. A tidewater power system as recited in claim 1, wherein said dam comprises a plurality of spaced vertical I-beams and a plurality of slabs extending between succesive verrical I-beams, adjacent surfaces of said slabs being lapped.

10. A tidewater power system as recited in claim 1, wherein said water wheel comprises a shaft and a plurality of radially extending paddles, each of said paddles being provided with vent apertures adjacent said shaft.

11. A tidewater power system as recited in claim 1, wherein said water wheel comprises a shaft, a plurality of radially extending paddles, and a pair of end plates concentric with said shaft closing the ends of said paddles, said end plates being provided with vent apertures adjacent said shaft.

12. A tidewater power system as recited in claim 1, further comprising gate means on the side of said dam facing said body of water, means for lowering said gate means to protect said water wheel from said body of water when desired.

13. A tidewater power system as recited in claim 1, further comprising gate means and means responsive to the speed of rotation of said water wheel for controlling the position of said gate means to control said water flow to said water wheel to maintain the speed of rotation of said water wheel substantially constant.

14. A tidewater power system as recited in claim 1, wherein said dam is so constructed that water flow to and from said body of water and said tidal reservoir is restricted to flow through said water wheel assemblies.

15. A tidewater power system, comprising:
a dam constructed in a body of water subject to tidal flow separating a tidal reservoir between a shoreline and said dam from said body of water, said dam including a plurality of vertical I-beams, each beam having a pair of flanges connected by a web, the webs of said I-beams being parallel, and a plurality of slabs extending between the webs of successive I-beams, the ends of said slabs being dimensioned to fit between the flanges of said I-beams;
a water wheel; and
means mounting said water wheel on said dam, said means comprising a pair of downwardly extending arms, one of which is received between the flanges of one of said I-beams and the other of which is received between the flanges of an adjacent one of said I-beams.

16. A tidewater power system as recited in claim 15, further comprising a generator housing enclosing an electric generator coupled to said water wheel, said generator housing comprising a pair of downwardly extending arms, one of which is received between the flanges of one of said I-beams and the other of which is received between the flanges of an adjacent one of said I-beams.

17. A tidewater power system, comprising:
a dam constructed in a body of water subject to tidal flow separating a tidal reservoir from said body of water;
a plurality of water wheels mounted on said dam;
means confining water flow to and from said body of water and reservoir through said water wheels; and
brake means for selectively precluding rotation of said water wheels to control said water flow, said brake means including a first part mounted for rotation with said water wheels and a second part engageable with said first part to brake to said water wheels.

18. A tidewater power system as recited in claim 15, further comprising plurality of said water wheel, universal joint means coupling adjacent water wheels, and a coupling housing positioned over said universal joint means, said coupling housing comprising a pair of downwardly extending arms, one of which is received between the flanges of one of said I-beams and the other of which is received between the flanges of an adjacent one of said I-beams.

19. A tidewater power system as recited in claim 15, wherein said system comprises a plurality of said water wheel and wherein said dam supports a track on each side of said wheels, and said system comprises a crane support extending over said wheel, said crane support including wheels engaging said tracks whereby said crane support may be moved along said dam to enable a crane mounted on said crane support to lift a said water wheel and said means mounting said water wheel from said dam.

20. A tidewater power system as recited in claim 15, further comprising a pair of catwalks, one on each side of the dam, extending lengthwise of the dam, means for supporting said catwalks on said dam, and a protective railing supported on the outward side of one of said catwalks.

21. A tidewater power system as recited in claim 20, further comprising a second protective railing on the inward side of said one of said catwalks.

22. A tidewater power system comprising:
a dam constructed in a body of water subject to tidal flow separating a tidal reservoir between a shoreline and said dam from said body of water;
a plurality of water wheel assemblies mounted on said dam, each including a water wheel, means directing water flow to said water wheel from one of said reservoir and said body of water, and means mounting said wheel for rotation about a horizontal axis; and
double universal joint means coupling said water wheels of adjacent water wheel assemblies.

23. A tidewater power system as recited in claim 22, wherein said double universal joint means includes a first shaft section extending from a first said wheel, a first universal joint coupling said first shaft section to a second shaft section, a sliding coupling between said second shaft section and a third shaft section, and a second universal joint coupling said third shaft section to a fourth shaft section extending to an adjacent said water wheel.

* * * * *

UNITED STATES PATENT OFFICE
CERTIFICATE OF CORRECTION

Patent No. 3,993,913          Dated November 23, 1976

Inventor(s) Smith V. Dickman

It is certified that error appears in the above-identified patent and that said Letters Patent are hereby corrected as shown below:

In Column 6, Line 8, "waer" has been changed to -- water -- .

In Column 9, Line 51, "e" has been changed to -- be -- .

Signed and Sealed this

Eighth Day of March 1977

[SEAL]

Attest:

RUTH C. MASON
*Attesting Officer*

C. MARSHALL DANN
*Commissioner of Patents and Trademarks*